(12) United States Patent
Hinson et al.

(10) Patent No.: US 7,673,804 B1
(45) Date of Patent: Mar. 9, 2010

(54) HANDLE FOR PORTABLE DATA TERMINAL

(75) Inventors: Douglas M. Hinson, Monroe, NC (US);
Larry Keith Hooks, Jr., Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1110 days.

(21) Appl. No.: 11/273,235

(22) Filed: Nov. 14, 2005

(51) Int. Cl.
*G06K 7/10* (2006.01)

(52) U.S. Cl. .................. 235/472.01; 235/462.45; 341/683

(58) Field of Classification Search ............ 235/472.01, 235/462.45; 361/683
See application file for complete search history.

(56) References Cited

U.S. PATENT DOCUMENTS

| | | | |
|---|---|---|---|
| 4,709,318 A | 11/1987 | Gephart et al. | |
| 4,772,769 A | 9/1988 | Shumate | |
| 5,028,806 A | 7/1991 | Stewart et al. | |
| 5,133,076 A | 7/1992 | Hawkins et al. | |
| 5,167,024 A | 11/1992 | Smith et al. | |
| 5,268,823 A | 12/1993 | Yergenson | |
| 5,323,291 A | 6/1994 | Boyle et al. | |
| 5,347,622 A | 9/1994 | Takemoto et al. | |
| 5,349,497 A * | 9/1994 | Hanson et al. | ............... 361/683 |
| 5,680,633 A | 10/1997 | Koenck et al. | |
| 5,739,596 A | 4/1998 | Takizawa et al. | |
| 5,796,982 A | 8/1998 | Iwami et al. | |
| 5,805,474 A | 9/1998 | Danielson et al. | |
| 5,841,424 A | 11/1998 | Kikinis | |
| 5,844,400 A | 12/1998 | Ramsier et al. | |
| 5,960,344 A | 9/1999 | Mahany | |
| 5,977,901 A | 11/1999 | Fenner | |
| 6,005,767 A | 12/1999 | Ku et al. | |
| 6,006,118 A | 12/1999 | Stephenson | |
| 6,049,813 A | 4/2000 | Danielson et al. | |
| 6,119,935 A | 9/2000 | Jelen et al. | |
| 6,149,062 A | 11/2000 | Danielson et al. | |
| 6,191,503 B1 | 2/2001 | Kitten et al. | |
| 6,292,863 B1 | 9/2001 | Terasaki et al. | |
| 6,312,278 B1 | 11/2001 | Prior | |
| 6,460,769 B1 * | 10/2002 | Knowles et al. | ......... 235/472.01 |
| 6,525,932 B1 | 2/2003 | Ohnishi et al. | |
| 6,668,296 B1 | 12/2003 | Dougherty et al. | |
| 6,799,719 B2 | 10/2004 | Peng | |
| 7,325,740 B2 * | 2/2008 | Schmidt et al. | ......... 235/462.45 |
| 7,431,215 B2 * | 10/2008 | Wilz et al. | ............. 235/462.45 |

* cited by examiner

*Primary Examiner*—Allyson N Trail
(74) *Attorney, Agent, or Firm*—Hiscock & Barclay, LLP

(57) ABSTRACT

A portable device having a body, a battery, a display, a data acquisition device, a handle, a trigger supported by the handle, and a first power port supported by the handle.

23 Claims, 7 Drawing Sheets

HANDLE FOR PORTABLE DATA TERMINAL

BACKGROUND OF THE INVENTION

Portable data terminals (PDT) are a type of data collection device used to collect, interpret, process, and ultimately transfer data to a larger data processing system. PDTs generally comprise a mobile computer, a keypad, and a data acquisition device. It is to be noted that some PDTs utilize more durable or "industrial" versions of their constituent components. The mobile computer generally comprises a hand held (or "pocket") computing device, such as those available from INTEL, PALM, HEWLETT PACKARD, and DELL. Keypads come in a variety of alpha-numeric and numeric configurations. The data acquisition device generally comprises a device that captures data from, for example, radio frequency IDs (RFID), images, and bar codes. Data may also be captured via keypad entry and utilization of a touch pad associated with the mobile computer. PDT's are available from several sources, including the assignee of the present application: HAND HELD PRODUCTS, INC.

FIG. 1A is an orthogonal view of a known PDT 100. FIG. 1B is a plan view of a known PDT 100. In particular, the example illustrated in FIG. 1A utilizes a popular form factor incorporating a body 102 and a handle 101. The body 102 generally supports a variety of components, including: a battery (not shown but typically located the rear half of the body); an LCD with touch screen 106; a keyboard 108 (including a scan button 108a); a scan engine 110; and a data/charging port 112 (not fully illustrated). The scan engine 110 may comprise, for example, an image engine or a laser engine. The data/charging port 112 typically comprises a proprietary (and often expensive) interface with one set of pins or pads for the transmitting and receiving of data and a second set of pins or pads for receiving power for powering the system and/or charging the battery.

The handle 101 extends from a bottom surface of the body 102 thereby facilitating a pistol like grip. Known handles, including the illustrated handle 101, incorporate a trigger 114 and a receptacle 116 (not fully illustrated) for receiving and retaining a stylus for activation of the touch screen 106.

In use, the user may actuate either the scan key 108a or the trigger 114 to initiate an image capture via the image engine 110. The captured image is analyzed, e.g. decoded, to identify the data it represents. The decoded data is stored and possibly displayed on the PDT 100. Additional processing of the data may take place on the PDT 100 and/or a data processing resource to which the data is transmitted via any available transport mechanism on the PDT 100. Some examples of known transport mechanisms utilized by PDT's include: Bluetooth, WiFi, GSM, CDMA, USB, IrDA, removable FLASH memory, parallel and serial ports (including for example, RS-232).

Handled PDTs, such as the PDT 100, are usually designed by adding a handle onto an existing bar shaped PDT. In some instances, the handle is a user assembled after-the-fact accessory. Accordingly, the present inventors have recognized a need for an improved handled portable data terminal. Additionally, it has been recognized that additional options for providing power to PDTs are needed as the cable assemblies required to interface with receptacles such as the receptacle 116 are expensive and cumbersome.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1A:
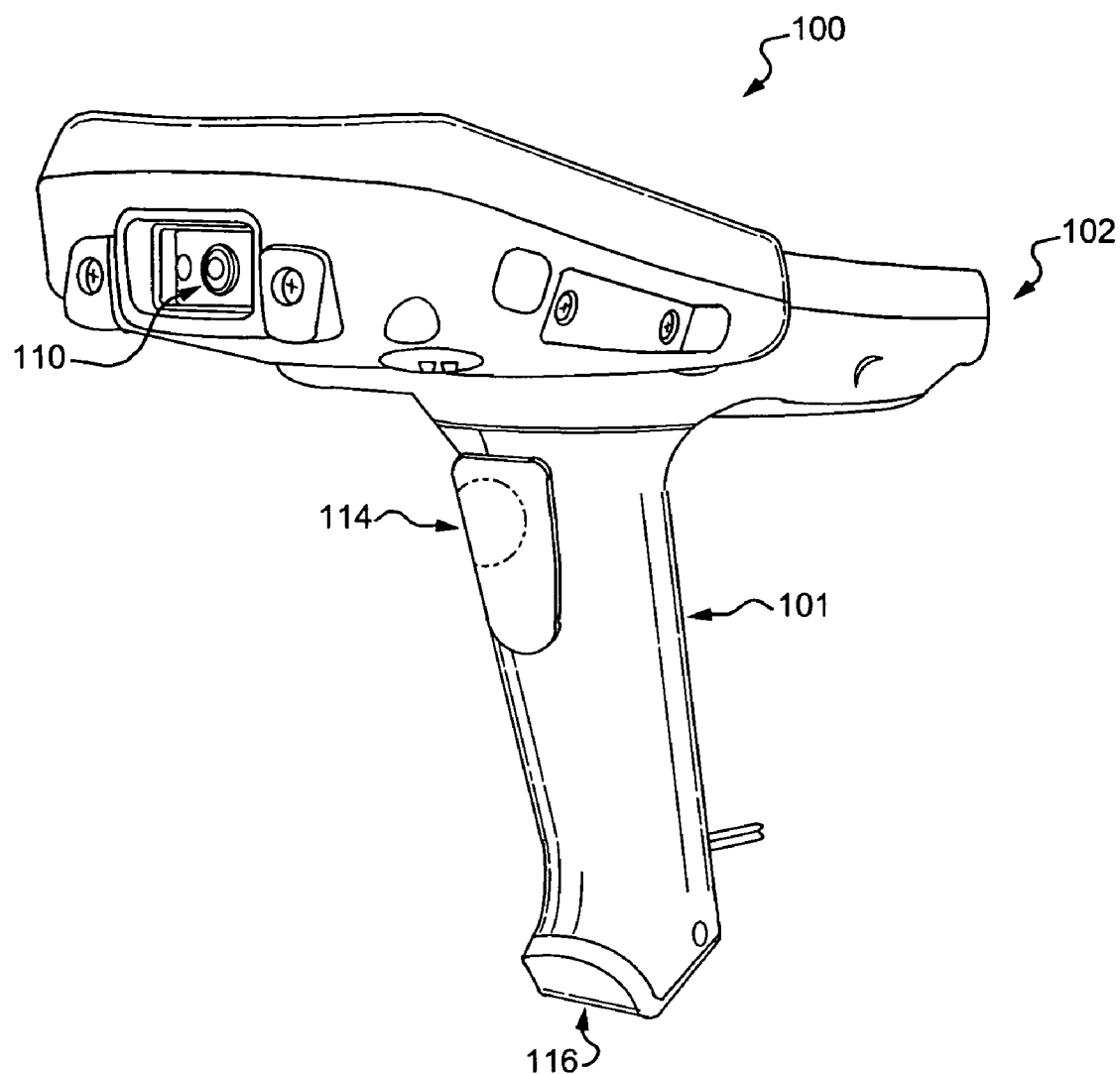
FIG. 1A is an orthogonal view of a known PDT.
Figure 1B:
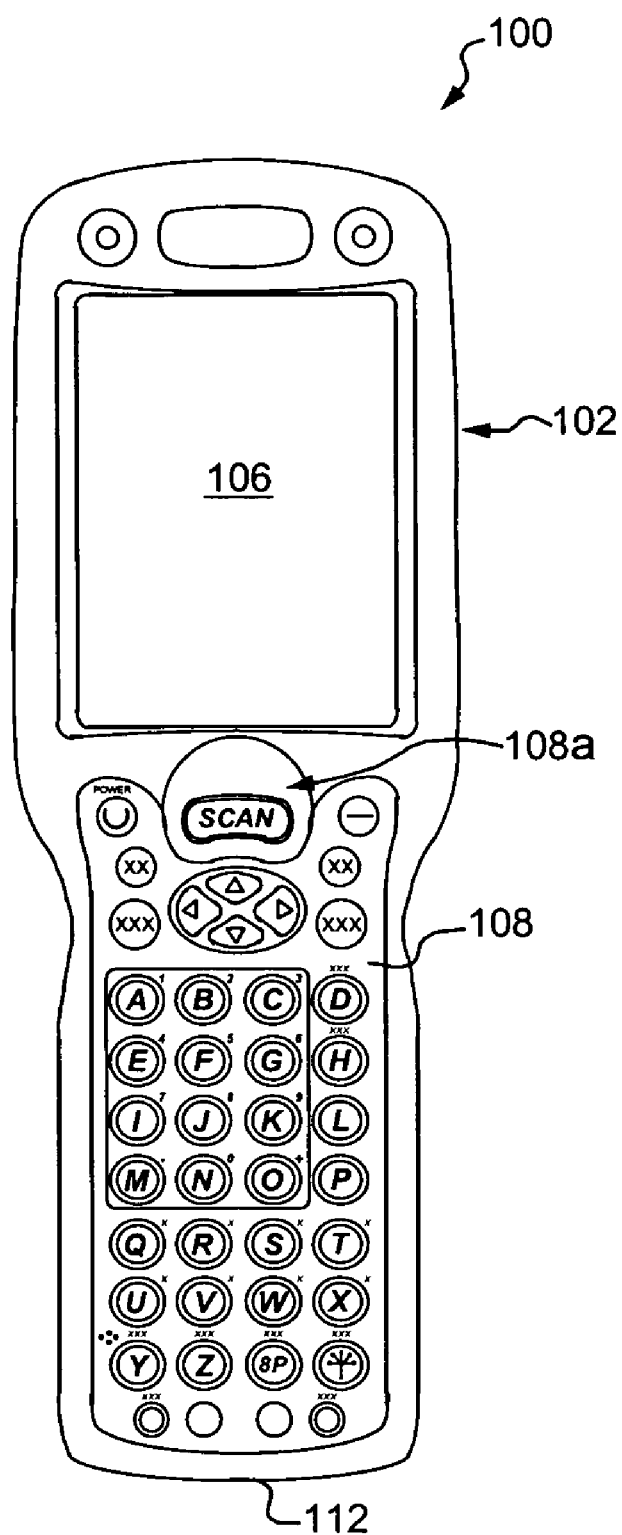
FIG. 1B is a plan view of a known PDT.

Reference will now be made in detail to the present invention, examples of which are illustrated in the accompanying drawings, wherein like reference numerals refer to like elements throughout. The following description will use nomenclature associated with a PDT, however those of ordinary skill in the art will recognize that the present invention is applicable to a variety of other portable devices including personal data assistants (PDAs); bar code scanners, consumer electronics (including portable radios, televisions and phones), and the like. It is anticipated that many such portable devices would benefit from the present invention, including the embodiments thereof described herein. It is to be noted that an element number followed by a letter generally indicates multiple occurrences of similar, either in structure or function, elements. Further, the use of an italicized "n" (e.g. n) associated with an element number generally denotes either an unspecified one of such elements or a partial or complete group of such elements—the meaning of which is to be drawn from the context of such use.

Figure 2:
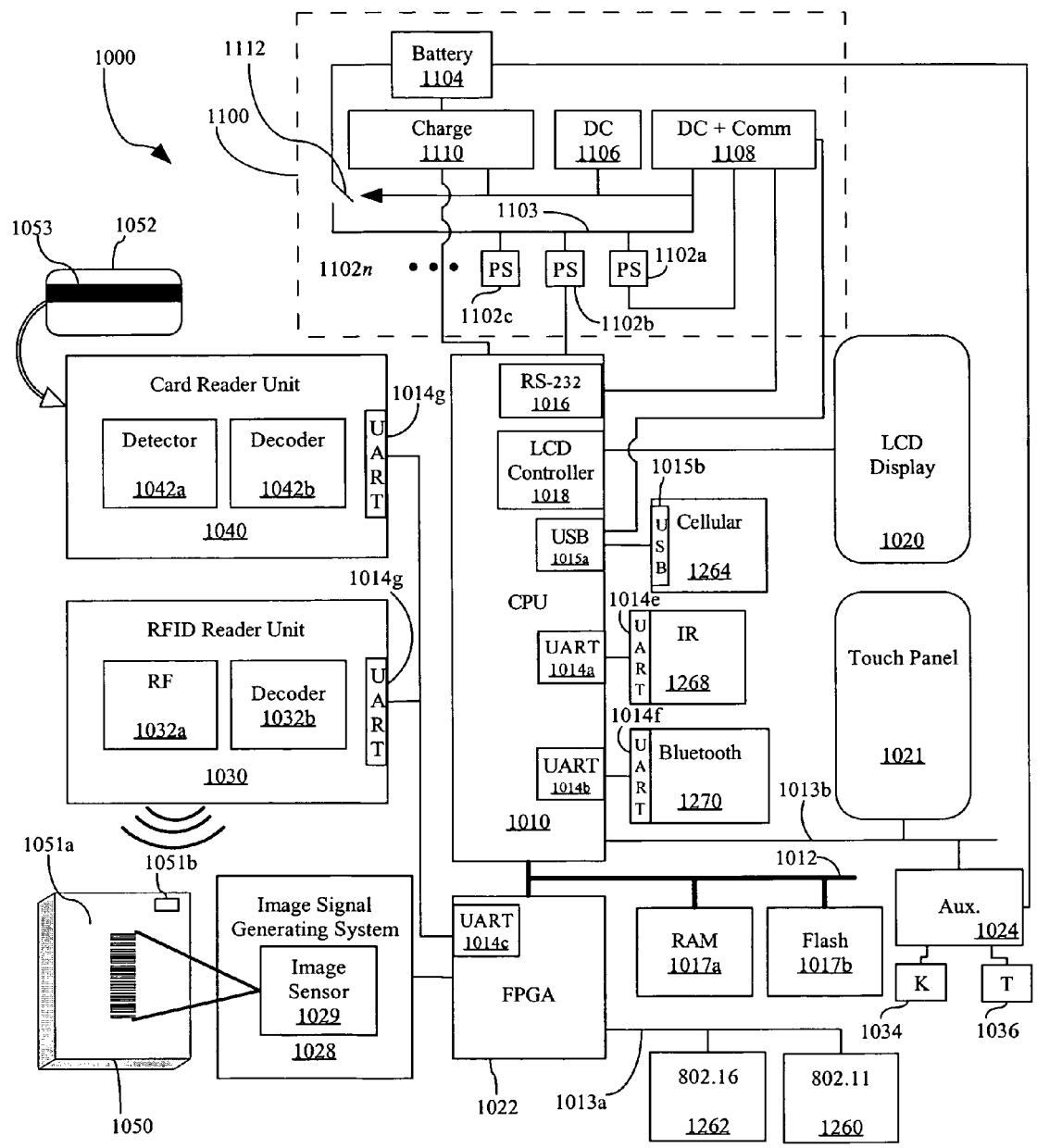
FIG. 2 is a block diagram of a PDT in accordance with an embodiment of the present invention.

FIG. 2 is a block diagram of a PDT 1000 in accordance with an embodiment of the present invention. Those of ordinary skill in the art will recognize that the illustrated design of the PDT 1000 has been simplified so as to permit a briefer explanation of systems and components not directly related to the present invention.

A central processing unit (CPU) 1010 receives data from and outputs data to other sub-systems for storage, transmission and additional processing. CPU 1010 may be implemented using any number of off the shelf solutions including: embedded processors, such as an XSCALE processor available from INTEL; general purpose processors, such as a PENTIUM 4 available from INTEL; or any number of custom solutions including pre-configured field programmable gate arrays (FPGAs) and application specific integrated circuits (ASICs). Overall operation of the CPU 1010 is controlled by software or firmware, typically referred to as an operating system, stored in one or more memory locations 1017n, including RAM 1017a and FLASH memory 1017b. Examples of suitable operating systems for PDT 1000 include graphical user interfaces such as WINDOWS MOBIL, WINDOWS CE, WINDOWS XP, LINUX, PALM, and OSX.

In general, communication to and from the CPU 1010 and among the various sub-components takes place via one or more ports or busses, including a main system bus 1012; I²C busses 1013a and 1013b; a plurality of Universal Asynchronous Receivers/Transmitter (UART) ports 1014n, a Universal Serial Bus (USB) 1015n, and an RS-232 port 1016.

The illustrated CPU 1010 also includes a liquid crystal display (LCD) controller 1018 for controlling an LCD 1020. A touch sensitive panel 1021, which may be in communication with one or more of the CPU 1010 and an auxiliary processor 1024 via the I²C bus 1013b, may be associated with the LCD 1020 for receipt of data thereon. The combination of the LCD 1020 and the touch sensitive panel 1021 is often referred to as a "touch screen."

A variety of secondary processors may be provided to perform general and application specific functions. The example illustrated in FIG. 2 provides two such processors: a field programmable gate array (FPGA) 1022 and the auxiliary processor 1024. The FPGA 1022 may comprise any number of FPGA including the Virtex-4 family of FPGAs available from XILINX. The auxiliary processor 1024 may comprise any number of embedded (or general purpose) processors, including the PICmicro® family of microcontrollers available from MICROCHIP TECHNOLOGY.

The auxiliary processor 1024 may interface with and control a variety of data input devices including, for example, the touch panel 1021, a keyboard 1034 and a trigger 1036. By way of example, the PDT 1000 may be configured so that displayed menu options are selected by physically depressing a key on the keyboard 1034 or activating the touch screen 1021 with use of a finger or stylus. The trigger 1036 may be used for initiating and controlling the various data collection systems, such as an image signal generating system 1028, an RFID sensing system 1030, or a magnetic stripe reader 1040.

The data collection systems (e.g. the image signal generating system 1028, the RFID sensing system 1030, and the magnetic stripe reader 1050) may be controlled by one or more of the CPU 1010, the auxiliary processor 1024, and the FPGA 1022. In this case, the FPGA 1022 initiates and controls the operation of the data collection systems and accumulates data received there from prior to depositing such data in memory 1017n. Possible configurations of FPGA 1022 are illustrated in U.S. Pat. No. 6,947,612 incorporated herein by reference.

The image signal generating system 1028 generally comprises a two dimensional solid state image sensor 1029 utilizing such technologies as CCD, CMOS, and CID, for capturing an image containing data, e.g. a bar code or signature. Two-dimensional solid state image sensors generally have a plurality of photo sensor picture elements ("pixels") which are formed in a pattern including a plurality of rows and a plurality of columns of pixels. The image signal generating system 1028 further includes an imaging optics (not shown) focusing an image onto an active surface of the image sensor 1029. Image sensor 1029 may be incorporated on an image sensor IC chip having disposed thereon image sensor control circuitry, image signal conditioning circuitry, and an analog-to-digital converter. FPGA 1022 manages the capture and transfer of image data into RAM 1017n. Decoding may be performed by the CPU 1010 or any suitable secondary processor. Examples of devices suitable for use as the imaging assembly 1028 include an IMAGETEAM 5x00VGA/5x00MPX imaging module of the type available from Hand Held Products, assignee of the present application. A variety of alternatives, including dedicated laser barcode scanners may also be utilized.

One use model of the image signal generating system 1028 is for reading and interpreting bar codes such as bar code 1051a on an item 1050. In this mode, when the trigger 1036 is actuated, the CPU 1010 causes the appropriate control signals to be sent to the image sensor 1029. In response thereto, the image sensor 1029 outputs digital image data including (hopefully) an adequate representation of the bar code symbol 1050. The digital image data is streamed to the FPGA 1022 where it is collected and subsequently deposited in memory 1017n. In accordance with a decoding program (not specifically illustrated) an attempt may be made to decode the bar code represented in the captured electronic image representation. The capture and decoding of image data may occur automatically in response to a trigger signal being generated, usually by activation of the trigger 1036 or a pre-selected key on keyboard 1034. For example, the CPU 1010 may be configured, typically through execution of a program resident in memory 1017n, to continuously capture and decode bar code symbols represented therein as long as trigger 1036 is actuated. The cycle may be terminated upon successfully decoding the bar code symbol or by timing out after a number of unsuccessful attempts.

In addition to having a decode mode of operation, the image signal generation system 1028 may also be configured for an image capture mode of operation. In an image capture mode of operation, control circuit 1010 captures an electronic image representation in response to the trigger 1036 being actuated without attempting to decode a decodable symbol represented therein. The captured electronic image representation may be one or more of (i) stored into a designated memory location of memory 1017n, (ii) transmitted to an external spaced apart device, or (iii) displayed on LCD 1020. This mode may be used to capture, for example an image of a signature or damage to a package.

The RFID reader unit 1030 includes an RF oscillation and receiver circuit 1032a and a data decode processing circuit 1032b. RFID reader unit 1030 may be configured to read RF encoded data from a passive RFID tag, such as tag 1051b, which may be disposed on article 1050.

Where the RFID reader unit 1032a is configured to read RF encoded data from a passive RFID tag, the RF oscillation and receiver circuit 1032a transmits a carrier signal to the passive tag which in turn converts the carrier energy to voltage form and actuates a transponder (not shown) to transmit a radio signal representing the encoded tag data. The RF oscillator and receiver circuit 1032a, in turn, receives the radio signal from the tag and converts the data into a digital format. The data decode processing circuit 1032b, typically including a low cost microcontroller IC chip, decodes the received radio signal information received by RF oscillator and receiver circuit 1032a to decode the encoded identification data originally encoded into RFID tag.

RFID reader unit 1030 may, for example, operate in a selective activation mode or in a continuous read operating mode. In a selective activation mode, RFID reader unit 1030 broadcasts radio signals in an attempt to activate a tag or tags in its vicinity in response to an RFID trigger signal being received. In a continuous read mode, RFID reader module 1030 continuously broadcasts radio signals in an attempt to actuate a tag or tags in proximity with unit automatically, without module 1030 receiving a trigger signal. PDT 1000 may be configured so that the CPU 1010 recognizes a trigger signal under numerous conditions, such as: (1) the trigger 1034 is actuated; (2) an RFID trigger instruction is received from a remote device; or (3) the CPU 1010 determines that a predetermined condition has been satisfied.

Still further, the PDT 1000 may include a card reader unit 1040 for reading data from a card 11052. Card reader unit 1040 generally comprises a signal detection circuit 1042a and a data decode circuit 1042b. In operation, the signal detection circuit 1042a detects data, from for example a magnetic strip 1053 on a card 1052. Subsequently, the data decode circuit 1042b decodes the data. The decoded data may be transmitted to the CPU 1010 for further processing via the FPGA 1022. The card reader unit 1040 can be selected to be of a type that reads card information encoded in more than one data format. For example, the card reader unit 1040 may comprise a Panasonic ZU-9A36CF4 Integrated Smart Reader capable of reading any one of magnetic stripe data, smart card or Integrated circuit card (IC card) data, and RF transmitted data.

A power circuit 1100 supplies power to the PDT 1000. The power circuit 1100 generally comprises a series of power supplies 1102n that regulate the power supplied to the various components of the PDT 1000. The power supplies 1102n each generally comprise step up or step down circuits which are in turn connected to each of the various components in the PDT 1000 that require the particular voltage output by that power supply 1102n.

The power supplies receive current from a power bus 1103 which is, in turn, supplied by one of a battery 1104, a first power input 1106 or a connector 1108 that includes a second power input. The first power input 1106 may comprise a DC power jack, for example, a 2.5 mm coaxial DC power plug which receives 9.5 volts from a conventional AC/DC transformer. The connector 1108 may comprise any number of known connection technologies, such as the D Series of circular plastic connectors or the HCL D-sub derivative design data transfer connector available from HYPERTRONICS, INC. Certain pins of the connector 1108 may be dedicated to receiving DC power, for example 9.5 volts, while other pins are dedicated to one or more communication paths, e.g. RS-232 and USB. It may also prove advantageous to provide DC power out, for example from a power supply 1102a, so as to power tethered accessories, such as external magnetic stripe or RFID readers (not shown). It may prove further advantageous to add circuitry to insulate the first power input 1106 from the second power input on the connector 1108 and other components in the PDT 1000 in the event that a user attempts to supply power to both power inputs.

The battery 1104 may be selected from any of a variety of battery technologies including NiMh, NiCd, Li Ion, or Li Polymer. The battery 1104 is charged by a charge circuit 1110 which receives power from either the first power input 1106 or the second power input on the connector 1108. The charge circuit may comprise any of a number of available circuits. In the example shown in FIG. 2, control is provided to the CPU 1016 which may modify the charging behavior of the charge circuit 1110 based on information generated by the auxiliary processor 1024. In this example, the auxiliary processor 1024 monitors battery chemistry, such as gas content, via known interfaces, such as the SMART battery interface as specified by the Smart Battery System Implementers Forum. A switch 1112 isolates the battery based upon the presence of power from the first power input 1106 or the second power input on the connector 1108. Thus, when an external power supply is connected to either the power input 1106 or the second power input on the connector 1108, the battery is isolated from the power supplies 1102n and may be charged via the charge circuit 110. Once power is removed from the power input 1106 and the connector 1108, the battery is connected to the power supplies 1102n.

The PDT 1000 may further include a plurality of wireless communication links such as an 802.11 communication link 1260, an 802.16 communication link 1262, a communication link 1264 for communication with a cellular network such as a network in accordance with the Global System for Mobile Communications (GSM), an IR communication link 1268, and a Bluetooth communication link 1270. Each of these links facilitates communication with a remote device and may be used to transfer and receive data.

Figure 3A:
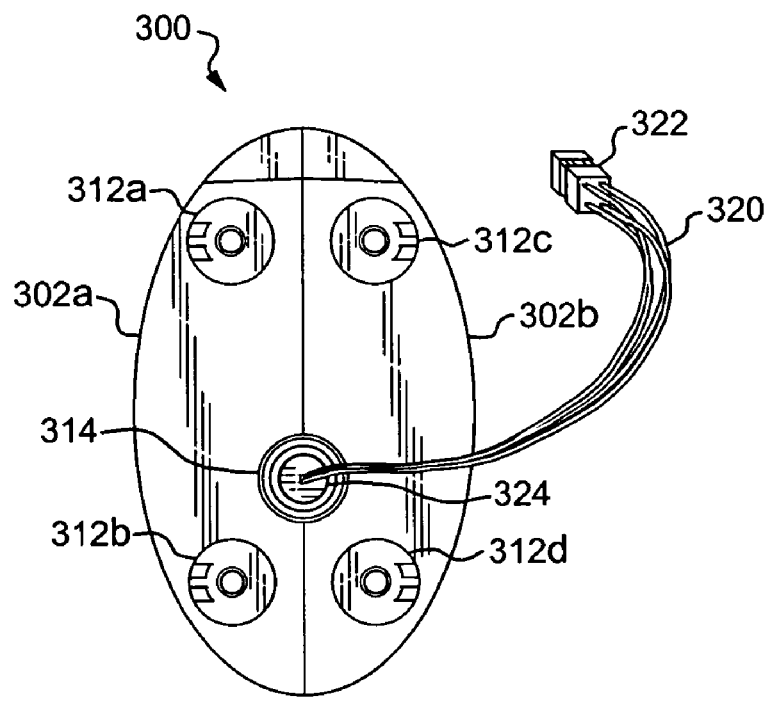
FIG. 3A is a top view of a handle in accordance with an embodiment of the present invention.
Figure 3B:
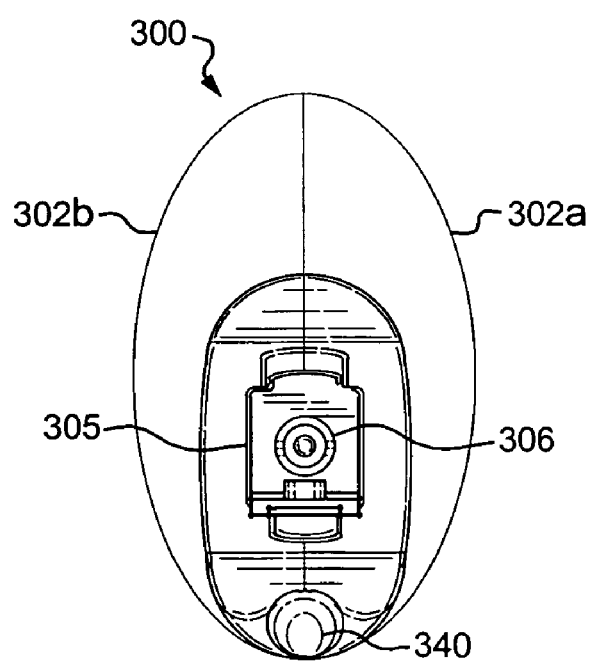
FIG. 3B is a bottom view of a handle in accordance with an embodiment of the present invention.
Figure 3C:
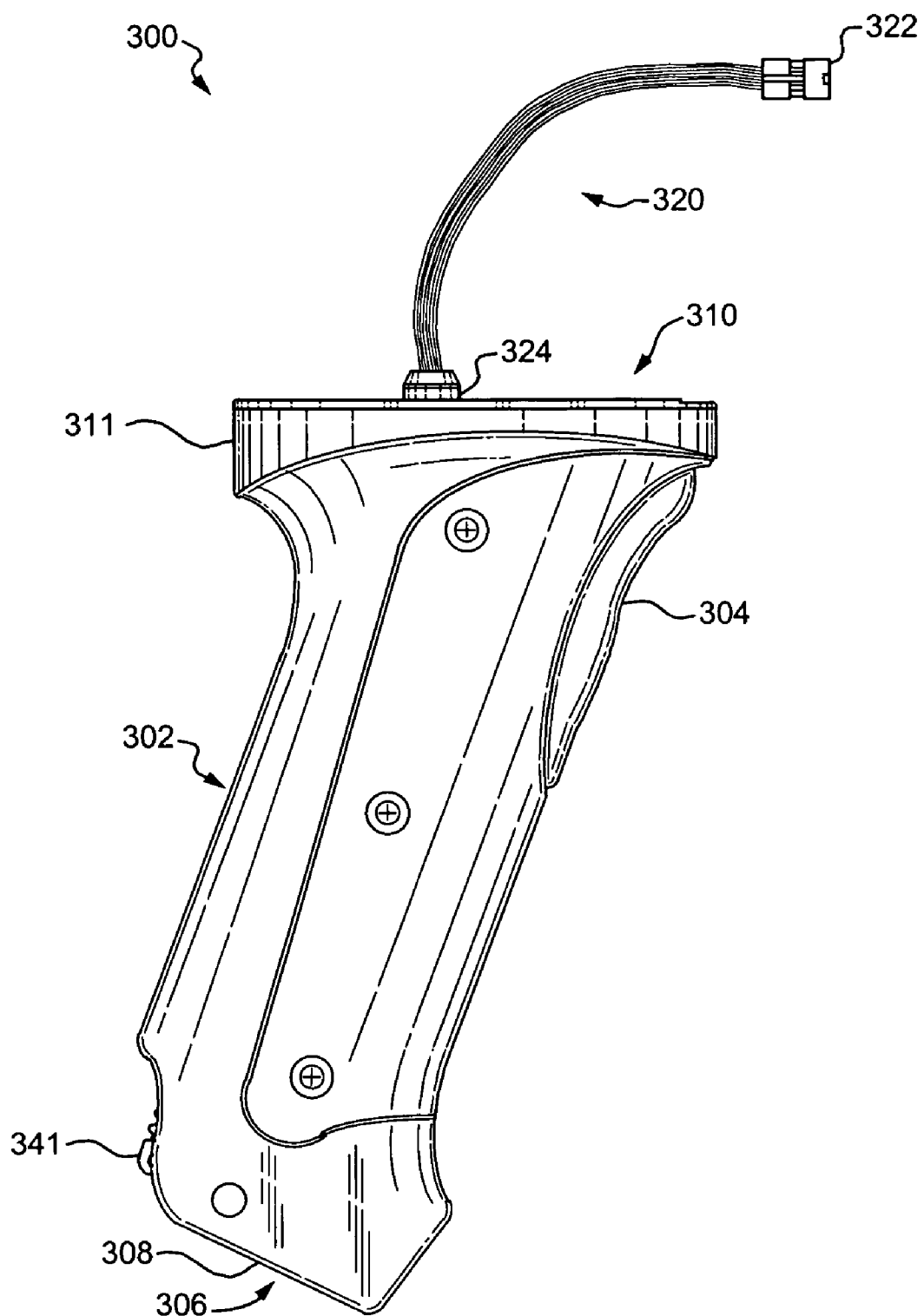
FIG. 3C is a side view of a handle in accordance with an embodiment of the present invention.
Figure 4:
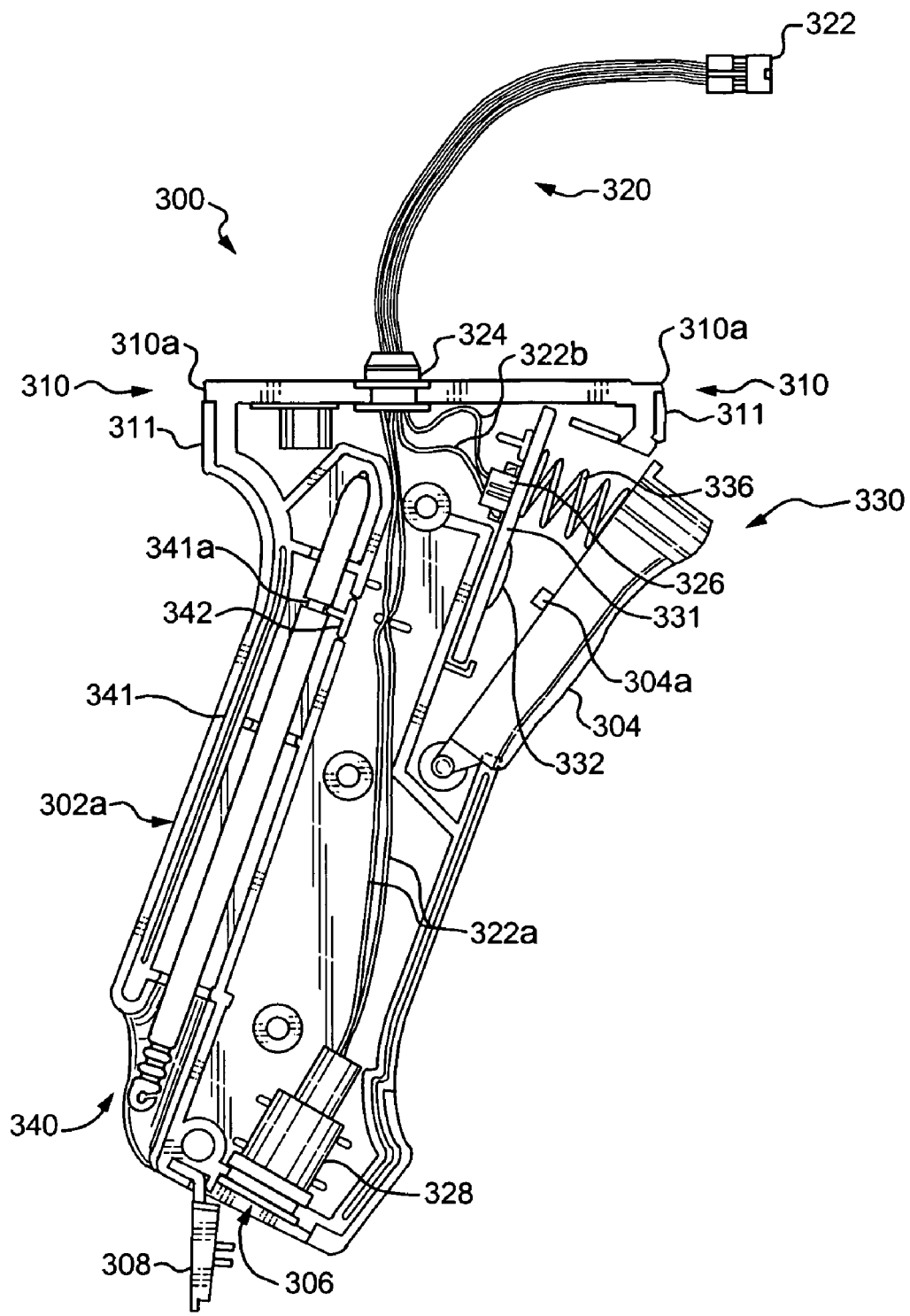
FIG. 4 is a cross-sectional view of a handle in accordance with a preferred embodiment of the present invention.

FIGS. 3A, 3B, and 3C are top, bottom and side views, respectively, of a handle 300 in accordance with an embodiment of the present invention. FIG. 4 is a cross-sectional view of a handle 300 in accordance with an embodiment of the present invention.

The handle 300 generally comprises an elongated housing 302 (in turn comprising a first half 302a and a second half 302b) with a trigger 304 on a side surface thereof and a charging port 306 on a bottom surface thereof. The charging port 306 may comprise a 2.5 mm DC plug. The top surface includes a mating portion 310 which is to be inserted into a recess on a lower portion of a body of a PDT. The mating portion 310 includes screw holes 312n and an opening 314 through which a wiring harness 320 passes. Rubber over-molding 311 surrounds the mating portion 310 preferably extending past an edge 310a thereof. The over-molding 311 mates with the walls of a cavity 506 in the body of the PDT (see FIG. 5) and, depending on the selected tolerances may conform thereto. The thickness of the over-molding 311 may be varied based on the tolerances available in the plastic molding process used to create the elongated housing 302. The rubber over-molding 311 is deformable and can serve to fill in (partially or fully) a tolerance induced gap between the edge 310a of the plastic projection 310 and the cavity 506 of the plastic housing 500. By filling in the gap between the handle 300 and the body 500 with rubber, the fit between the two is improved and movement may be reduced between the two parts when under stress.

A wiring harness 320 extends from an opening 305 in the top of the handle 300 through the opening 314 on the top of the handle 300. A first end, the end exiting the opening 314, of the wiring harness 320 is provided with a plug 322. The plug 322 is adapted to interface with a receptacle on a board supported in the body (not shown). In the embodiment illustrated in FIGS. 3 and 4, four wires extend from the plug 322 into the handle 300. Two wires (collectively 322b) interface with the trigger 304 while the other two wires (collectively 322a) interface with the charging port 306. A gasket 324 is overmolded onto the wiring harness 320 and seals the opening 314. Similarly, a gasket 328 is overmolded on to the ends of the wires 322a to cover otherwise exposed solder joints with the charging port 306. The charging port may be protected by a rubber flap 308. The ends of the wires 322b are connected to a printed circuit board 331 of the trigger assembly 330, for example using a plug 326 or by being soldered thereto.

The trigger assembly generally comprises the PCB 331; a metal dome switch 332 mounted to the PCB 331; and a trigger 304 biased away from the PCB 331 by a spring 336. When pressed, a projection 304a on the trigger 304 activates the switch 332 thereby electrically connecting the ends of the trigger wires 322b allowing a signal to pass there through (of course the switch 332 could also open the circuit to indicate activation of the trigger 304). It may be preferable for the trigger operation to be handled in the same manner as a press on the keyboard 1034. Alternatively, the trigger may be implemented as an interrupt.

The handle halves 302a and 302b are preferably injection molded. Injection molding utilized two or more dies which are filled with a plastic material and then pulled apart to produce the molded article. As the dies are pulled apart, their movement must be unimpeded by features in the article. Looking at FIG. 4, a T-shaped tab 342 is molded adjacent to a channel extending from the opening 340 which receives a stylus 341. The tab 342, flexes toward the trigger 302 as the stylus is inserted and then biases against a groove 341a in the stylus 341 to secure the stylus 341 upon full insertion into the handle. Notice that the biasing force acts at right angles to the direction of mold movement during formation of the handle half 302a.

Figure 5:
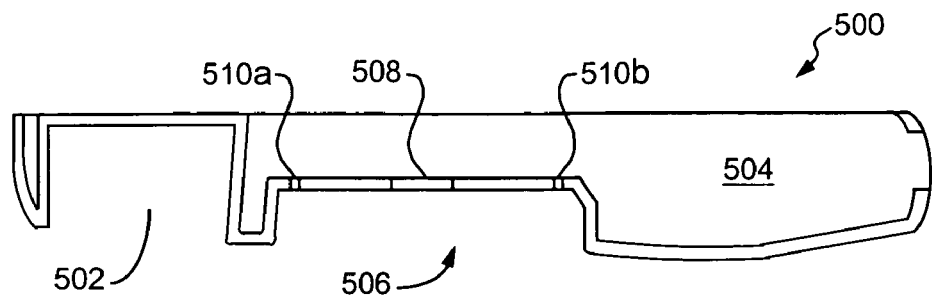
FIG. 5 is a cross sectional view of a portion of a body in accordance with an embodiment of the present invention.

FIG. 5 is a cross sectional view of a portion of a body in accordance with an embodiment of the present invention. In particular, FIG. 5 illustrates a lower half 500 of a body of a PDT. The lower half 500 generally defines three cavities: a battery cavity 502, an electronics cavity 504 and a handle cavity 506. The battery cavity 502 is shaped to receive and secure a battery (not shown). The electronics cavity 504 is shaped to receive and support a variety of mechanical and electrical components, such as one or more printed circuit boards, an imaging engine, a central processing unit, memory, and antennas.

The handle cavity 506 is shaped to receive a handle 300 and in particular the mating portion 310. The handle cavity is provided with an opening 508 for receiving the first end of the wire harness 320. It may prove beneficial for the opening 508 to closely interface with the gasket 324 so as to protect the wires 320. Screw holes 510n are provided to receive screws (not shown) which terminated in screw holes 312n in the handle 300.

Figure 6:
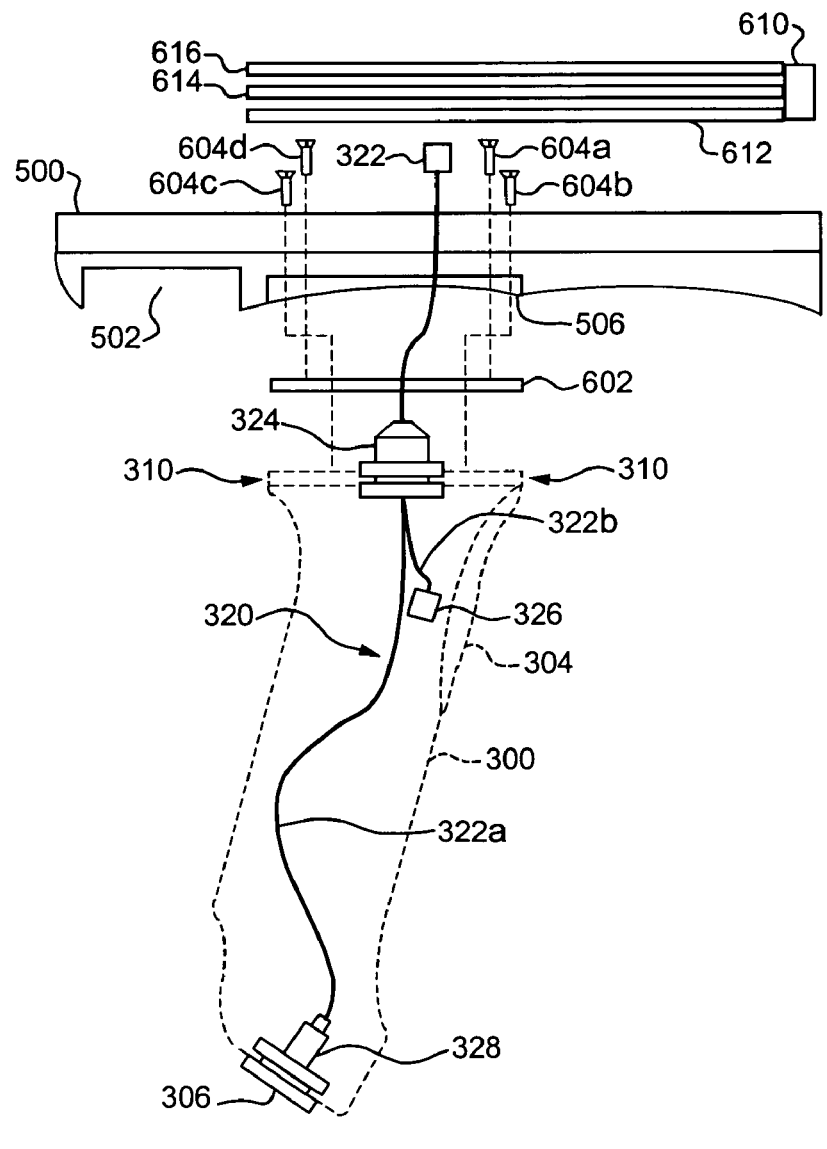
FIG. 6 is an assembly diagram of a PDT in accordance with a preferred embodiment of the present invention.

FIG. 6 is an assembly diagram of a PDT in accordance with a preferred embodiment of the present invention. In general, the projection 310 of the handle 300 is secured in the recess 506 of the lower body half 500 with screws 604n. A layer of flexible adhesive 602 is provided between the body 500 and the handle 300. The flexible adhesive 602 may, for example, comprise a layer of foam adhesive tape cut to fit the recess 506. The flexible adhesive 602 provides sealing around screw holes 510n and adds additional strength to compensate for the loosening of screws 604n.

An idealized electronics package is illustrated by elements 610 through 616. The electronic package is supported by body 500 and generally comprises an imager 610, a printed circuit board 612, an LCD 614 and a touch panel 616. The connector 322 is connected to an interface on the printed circuit board 612 and supplies power and an indication of the activation of the trigger 304 thereto.

Although some embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A portable device comprising:
   a body having a top surface and a bottom surface;
   a battery;
   a display supported by the body and disposed toward the top surface of the body;
   a data acquisition device supported by the body;
   a handle disposed proximate the bottom surface of the body;
   a trigger assembly supported by the handle;
   a first power port recessed in the handle, the first power port being adapted to interface with a cylindrical mating connector; and
   a wire harness connecting the first power port and the trigger assembly with the data acquisition device.

2. A portable device, as set forth in claim 1, wherein the battery is housed in the body.

3. A portable device, as set forth in claim 1, wherein the trigger assembly includes a printed circuit board, a dome switch and a trigger having a projection for engaging the dome switch upon user engagement with the trigger.

4. A portable device, as set forth in claim 1, further comprising:
   a gasket supported by the handle in an opening on an upper surface thereof, through which signal lines from the trigger assembly and the first power port pass.

5. A portable device, as set forth in claim 1, wherein the body is provided with a recess into which the handle is secured.

6. A portable device, as set forth in claim 5, further comprising:
   a flexible adhesive layer between the body and the handle.

7. A portable device, as set forth in claim 5, further comprising:
   overmolding covering at least some of the portion of the handle that is inserted into the recess, wherein the handle is dimensioned to leave a gap around a periphery thereof when inserted into the recess and wherein the overmolding serves to reduce the gap.

8. A portable device, as set forth in claim 7, wherein the overmolding has a thickness greater than the gap such that the overmolding is deformed when the handle is inserted into the body.

9. A portable device, as set forth in claim 1, wherein the handle comprises two halves formed by injection molding, the two halves having walls which combine to form a channel adapted to receive a stylus and wherein at least one wall in at least one half is provided with a flexible tab that secures a stylus, the flexible tab being flexible in a direction traverse to a direction of mold movement during formation of the at least one half.

10. A portable device, as set forth in claim 1, wherein the data acquisition device comprises at least one of: a bar code reader activated by the trigger assembly; a magnetic stripe reader; and an RFID sensor activated by the trigger assembly.

11. A portable device, as set forth in claim 1, further comprising:
   a first over-molding protecting a portion of the wire harness, the first over-molding supported by the handle and extending into the body; and
   a second over-molding protecting the first power port, the second over-molding supported by the handle.

12. A portable device, as set forth in claim 1, further comprising:
   a second power port supported by the body, wherein the second power port is integrated with a communication port that provides a communication link to the portable device.

13. A portable device, as set forth in claim 1, further including a touch panel facilitating interaction with information on the display.

14. A portable device, as set forth in claim 13, further including a controller for operating the data acquisition device, the display, and the touch panel.

15. A portable device, as set forth in claim 14, wherein the battery is a rechargeable battery providing power to the controller, the data acquisition device, the display and the touch panel.

16. A portable data terminal comprising:
   a body having a top surface and a bottom surface;
   a data acquisition device supported by the body;
   a display supported by the body and disposed toward the top surface of the body;
   a touch panel facilitating interaction with information on the display;
   a controller controlling operation of the data collection device, the display and the touch panel;
   a rechargeable battery providing power to the controller, data collection device, the display screen and the touch panel;
   a handle disposed proximate the bottom surface of the body;
   a trigger assembly supported by the handle, wherein the trigger assembly includes a printed circuit board, a dome switch, and a trigger having a projection for engaging the dome switch upon user engagement with the trigger;
   a power port recessed in the handle, the power port being capable of receiving a current for operating the portable data terminal;
   a wire harness connecting the power port with the battery and the trigger assembly with the controller, the wire harness having a first end extending into the body, a first over-molding supported by the handle and extending into the body, a second over-molding supported by the handle and in turn supporting the power port, and a connector for carrying a signal indicative of activation of the trigger; and
   a gasket supported by the handle in an opening on an upper surface thereof, through which signal lines from the trigger assembly and the power port pass.

17. A wire harness for a portable data terminal, the wire harness comprising:
   a plurality of wires;
   a first connector attached to a first end of the plurality of wires adapted to interface with electronics;
   a first over-molding through which the plurality of wires pass;
   a second connector connected to seconds ends of a subset of the plurality of wires, the second connector adapted to interface with a button;
   a power port connected to second ends of a subset of the plurality of wires; and
   a second over-molding surrounding a portion of the power port.

18. A portable data terminal comprising:
   a display;
   a data acquisition device;
   a data processing unit;
   at least one power supply circuit;
   a battery connected to the at least one power supply circuit;
   a first power input connected to the at least one power supply circuit;
   a connector including connections for a second power input connected to the at least one power supply circuit and further including connections for a communication link; and
   at least one data path in connection with the data processing unit and the connector.

19. A portable data terminal, as set forth in claim 18, wherein the first power input is a DC barrel jack.

20. A portable data terminal, as set forth in claim 18, wherein the at least one data path comprises at least one of an RS-232 data path and a USB data path.

21. A portable data terminal, as set forth in claim 18, wherein the connector further includes connections for a power output connected to the at least one power supply circuit.

22. A portable data terminal, as set forth in claim 18, wherein the battery is connected to the at least one power supply through a switch that is opened when power is supplied to either of the first or second power inputs.

23. A portable data terminal, as set forth in claim 18, further comprising a charging circuit connected to the battery and the first and second power inputs, the charging circuit charging the battery when power is supplied to either of the first or second power inputs.

* * * * *